US012638696B2

(12) United States Patent | (10) Patent No.: US 12,638,696 B2
Rand | (45) Date of Patent: May 26, 2026

(54) CUSTOM CORRECTIVE LENS

(71) Applicant: David Rand, Millinocket, ME (US)

(72) Inventor: David Rand, Millinocket, ME (US)

( * ) Notice: Subject to any disclaimer, the term of this patent is extended or adjusted under 35 U.S.C. 154(b) by 337 days.

(21) Appl. No.: 18/503,262

(22) Filed: Nov. 7, 2023

(65) Prior Publication Data

US 2024/0280833 A1 Aug. 22, 2024

Related U.S. Application Data

(60) Provisional application No. 63/447,403, filed on Feb. 22, 2023.

(51) Int. Cl.
*G02C 7/02* (2006.01)
*A61F 9/02* (2006.01)
*G02C 7/00* (2006.01)

(52) U.S. Cl.
CPC ......... *G02C 7/027* (2013.01); *G02C 2202/02* (2013.01); *G02C 2202/06* (2013.01); *G02C 2202/24* (2013.01)

(58) Field of Classification Search
CPC ......... A61B 3/02; A61B 3/102; A61B 3/0075; A61B 3/113; A61B 3/1015; A61B 3/1225; A61B 3/024; A61B 3/005; A61F 9/026; B29G 64/386; B29G 64/135; B29G 64/188; B29G 69/02; B29G 45/14; G02C 7/024; G02C 7/00; B33Y 10/00; B33Y 50/00; B33Y 40/20
USPC ........... 351/159.74, 200, 205, 206, 208–210, 351/221–223, 245, 246, 41, 159.01, 351/159.73, 159.75–159.77, 159.78
See application file for complete search history.

(56) References Cited

U.S. PATENT DOCUMENTS

| | | | | |
|---|---|---|---|---|
| 9,341,867 | B1 * | 5/2016 | Kim | A61B 3/0025 |
| 10,750,943 | B2 | 8/2020 | Soetikno | |
| 2006/0268225 | A1 * | 11/2006 | Lieberman | G02C 7/04 351/159.74 |
| 2010/0123875 | A1 * | 5/2010 | Gemoules | G06T 7/50 351/247 |
| 2014/0186350 | A1 * | 7/2014 | Ghosh | A61K 31/713 424/134.1 |
| 2014/0192327 | A1 | 7/2014 | Sindt | |
| 2014/0330376 | A1 * | 11/2014 | Kleinman | A61F 9/00825 606/107 |
| 2017/0212277 | A1 * | 7/2017 | Chapoy | G02B 1/041 |
| 2018/0001581 | A1 * | 1/2018 | Patel | B29D 11/00961 |
| 2021/0016496 | A1 | 1/2021 | Chen | |
| 2022/0118685 | A1 | 4/2022 | Pascual | |
| 2022/0168960 | A1 | 6/2022 | Muller | |
| 2023/0258958 | A1 * | 8/2023 | Esfandiarijahromi | G02C 7/061 351/159.01 |

* cited by examiner

*Primary Examiner* — Dawayne Pinkney
(74) *Attorney, Agent, or Firm* — Brennan, Manna & Diamond, LLC

(57) ABSTRACT

A custom lens device is disclosed as a corrective lens created by a specialized 3D printer. Specifically, a qualified technician working with an ophthalmologist and/or an optometrist combine laboratory measurements of the retina and other eye surfaces, then combine that data with subjective input from the patient's correction to an Amsler grid, to create a custom lens that will un-distort vision which has been distorted (i.e., warped), due to undulations in the retina caused by a number of eye diseases, including, but not limited to, epiretinal membrane and macular degeneration.

19 Claims, 4 Drawing Sheets

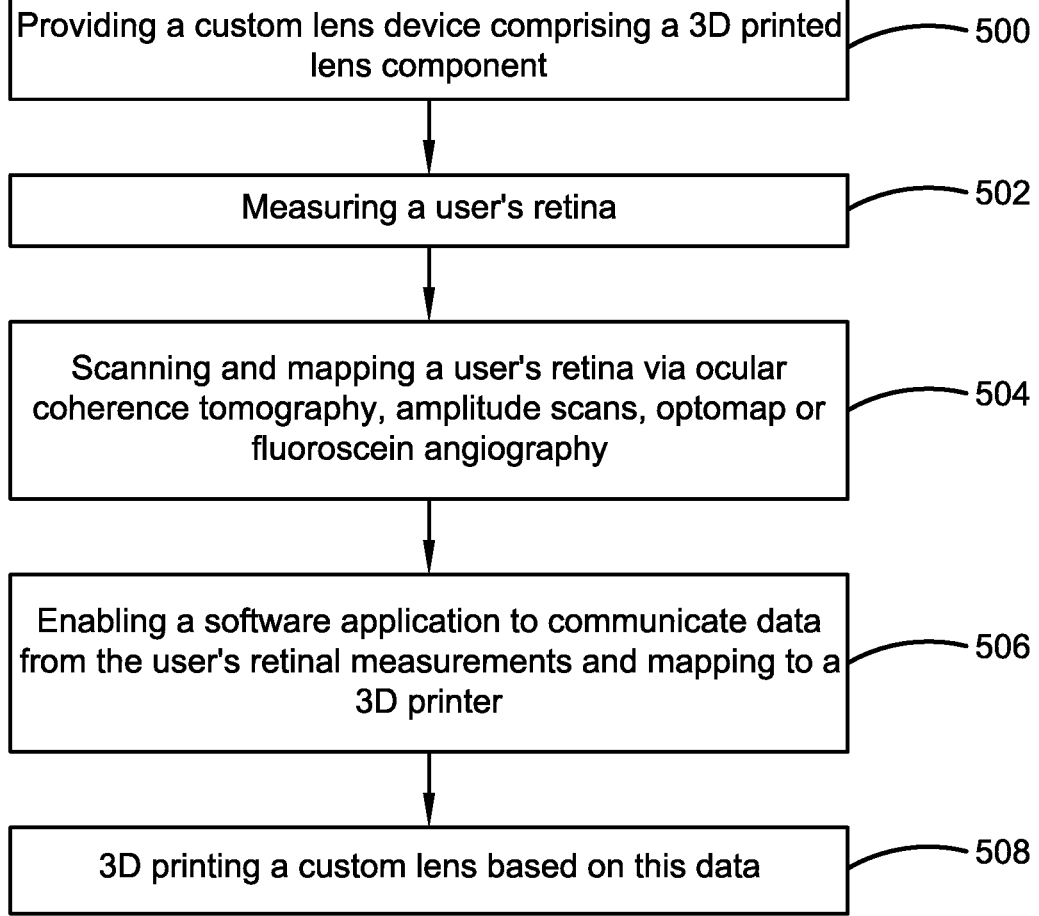

Providing a custom lens device comprising a 3D printed lens component — 500

Measuring a user's retina — 502

Scanning and mapping a user's retina via ocular coherence tomography, amplitude scans, optomap or fluoroscein angiography — 504

Enabling a software application to communicate data from the user's retinal measurements and mapping to a 3D printer — 506

3D printing a custom lens based on this data — 508

FIG. 5

CUSTOM CORRECTIVE LENS

CROSS-REFERENCE TO RELATED APPLICATION

The present application claims priority to, and the benefit of, U.S. Provisional Application No. 63/447,403, which was filed on Feb. 22, 2023, and is incorporated herein by reference in its entirety.

FIELD OF THE INVENTION

The present invention relates generally to the field of custom lens devices. More specifically, the present invention relates to a custom corrective lens for a user, which is made by scanning and mapping the retina and then creating a 3D printed custom lens to correct a user's warped vision caused by a retinal deformation. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in custom lens devices. Generally, warped vision due to eye diseases like epiretinal membrane puckering and macular degeneration, can be difficult to treat. Further, there may be no permanent treatment for these types of conditions.

Conventionally, a lens is manufactured via a molding process in which lens material (in liquid form) is poured or injected into a mold to form the lens. However, this process is not patient specific and is limited in the lenses produced. Further, three-dimensional printing or additive manufacturing can produce lenses having more corrective details than a lens made from the molding process and can be patient specific.

Accordingly, a need remains for a custom lens device that is patient specific or customized to a particular user. Further, the customized lens needs to be processed in a manner that allows for incorporating corrective details that have been derived from retinal mapping of the user's retinas. Additionally, the custom lens is needed to correct various eye diseases.

Therefore, there exists a long-felt need in the art for a custom lens device that provides users with a 3D printer and process that uses optical coherence tomography (OCT) scans and subjective data, like that derived from a corrected Amsler grid to produce a custom lens. There is also a long-felt need in the art for a custom lens device that combines laboratory measurements of the retina and other eye surfaces that combine data with subjective patient input corrections to the Amsler grid to create a custom lens. Further, there is a long-felt need in the art for a custom lens device that helps correct distorted and warped vision due to various eye diseases, like epiretinal membrane and macular degeneration. Moreover, there is a long-felt need in the art for a device that enables a software application to communicate the data to the printer and create the patient's custom lens. Further, there is a long-felt need in the art for a custom lens device that can be produced as a replacement lens, a contact lens, or a lens for eyeglass frames. Finally, there is a long-felt need in the art for a custom lens device that can be a 3D printed scleral lens. A scleral lens is currently the most suited contact lens for this invention because it will not rotate on the eye thereby keeping the corrective layer for the retinal deformation locked in the correct position.

The subject matter disclosed and claimed herein, in one embodiment thereof, comprises a custom lens device. The device is a corrective lens created by a specialized 3D printer, or other three dimensional creating device, including injection molds, by which a qualified technician working with an ophthalmologist and/or an optometrist combine laboratory measurements of the retina and other eye surfaces, then combine that data with subjective input from the patient's correction to an Amsler grid, or other diagram, to create a custom lens that will un-distort vision which has been distorted (i.e., warped), due to undulations in the retina caused by a number of eye diseases, including, but not limited to, epiretinal membrane and macular degeneration.

Typically, the retina would be scanned and mapped using Ocular Coherence Tomography (OCT) or other topographical measuring devices like A scan (Amplitude Scan), widefield retinal imaging, Flourescein Angiography, or other fine three-dimensional measuring tools. The lens can be inserted as a replacement lens to the patient's biologically native lens, and is correctable over time if necessary, or a contact lens that is weighted to remain on axis or put into common eyeglass frames that, although cannot move with the eye's axis of rotation, may greatly enhance reading ability or vision with low eye movement. Further, scleral lenses are an excellent platform for treating High Order Aberrations because they remain stable on the eye, and therefore may be 3D printed and utilized with the device.

The custom lens device will be a 3D printed polymer or will be created from a 3D printed mold from the lens materials, or through other three-dimensional processes. This lens device may also be made conventionally, but with potentially less accuracy. By 3D printing or other three-dimensional processes, the lens device can pick up more corrective details derived from a map of the retinal surface inverted and reversed where, for example, but not limited to, convex bumps in the retina become corrected by concave parts of the lens device, where it translates best to reverse the warped signal to the brain caused by the uneven, damaged retina. The lens will employ what is known as free form optics, also known as a wobbly lens to complement the organic distortion of the retina using optimal transport techniques.

In this manner, the custom lens device of the present invention accomplishes all of the foregoing objectives and provides users with a device that is patient specific based on information communicated to a 3D printer. The device produces a customized lens to correct distorted and warped vision.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a custom lens device. The device is a corrective lens created by a specialized 3D printer, or other three dimensional creating device, driven by Cad Cam lathe, or other 3D software packages, by which a qualified technician working with an ophthalmologist and/or an optometrist combine laboratory measurements of the retina and other eye surfaces, then combine that data with subjective input from the patient's correction to an Amsler grid, or other diagram, to create a custom 3D printed lens that will un-distort vision which has been distorted (i.e., warped), due to undulations in the retina caused by a number of eye diseases, including, but not limited to, epiretinal membrane and macular degeneration.

In one embodiment, users with various eye diseases which cause undulations in the retina, such as epiretinal membrane or macular degeneration, etc., or any other eye disease as is known in the art, can be difficult to treat. This is typically due to the convex bumps in the retina, creating an uneven, damaged surface and causing distorted and warped vision.

In one embodiment, a qualified technician working with an ophthalmologist and/or an optometrist combine laboratory measurements of the retina and other eye surfaces, then combine that data with subjective input from the patient's correction to an Amsler grid, revealing subjective analysis of the perceived distortion by the patient, or other diagram, to create the custom lens device that will un-distort vision which has been distorted (i.e., warped), due to undulations in the retina. The Amsler grid is a physical examination used to detect vision problems resulting from damage to the macula or the optic nerve. Specifically, the retina would be scanned and mapped using Ocular Coherence Tomography (OCT) or other suitable topographical measuring devices like an A scan (Amplitude Scan), wide-field retinal imaging, Flourescein, Angiography, or other fine three-dimensional measuring tools as is known in the art, depending on the needs and/or wants of a user.

In one embodiment, the custom lens device can be a lens which is inserted as a replacement lens to the patient's biologically native lens and is correctable over time if necessary. The custom lens device can also be a contact lens that is weighted to remain on axis to correct the user's vision. Further, the custom lens device can be a lens that is put into common eyeglass frames that although cannot move with the eye's axis of rotation but may greatly enhance reading ability or vision with low eye movement. Further, the custom lens device can also be a scleral lens, which is an excellent platform for treating High Order Aberrations because they remain stable on the eye. Therefore, the scleral lens may be 3D printed and utilized with the device.

In one embodiment, once the data is collected from measuring, mapping, and scanning the retina, the data is then sent to a software application. The user then enables the software application to communicate the data to the 3D printer to create the custom lens device directly or a mold that can be injected with a polymer later. Specifically, the custom lens device will be a 3D printed polymer or will be created from a 3D printed mold created from the lens materials, or through other three-dimensional processes. This custom lens device may also be made conventionally, or with a cad cam driven lath or cutting tool, but with potentially less accuracy.

In one embodiment, additionally input parameters can be utilized to 3D print the custom lens device. These input parameters are input into the 3D printer and include, but are not limited to, myopia or hyperopia degree, astigmatism, light transmittance, the radian of the eyeball, etc., or any other suitable input parameters as is known in the art, depending on the needs and/or wants of a user. In one embodiment, the additional input parameters include the measurement of a user's corneal diameter, radius of curvature, and/or the base arc of the user's eyeball.

In one embodiment, the 3D printing process includes placing droplets of lens material (resin) in a layer-by-layer manner on a substrate to create the custom lens device. Each of these layers is very thin (i.e., with thicknesses on the order of microns), but in aggregate, they can form a thicker optical segment (i.e., with a thickness on the order of millimeters or centimeters). The layers are cured (i.e., layer-by-layer with heat or UV light) to form the custom lens device.

Further, since each droplet can be small (i.e., on the order of microns) and the droplets can be deposited in almost arbitrary shapes, such that they can be used to make custom surfaces for prescription lenses that don't need to be ground or finished.

Once cured, a custom lens device is formed (i.e., a contact lens, a replacement lens, a Scleral lens, or an eyeglass frame lens, etc., or any other customized optical component as is known in the art).

In one embodiment, the substrate can include any substrate that can support the processing of the custom lens device via 3D printing. If desired, the substrate can include or be coated with a non-stick material. For example, the substrate can include silicone, polydimethylsiloxane (PDMS), polytetrafluoroethylene (PTFE), ceramic, or any other non-stick material. In another example, the substrate can include a rigid material coated with a non-stick material on the surface. For example, the rigid material can include plastic, metal, or glass. If desired, a portion of the substrate may be patterned or indented to hold the custom lens device. The substrate can also have a dimple or depression for molding the custom lens device. Resin or other polymers may be deposited in the depression and cured to form a concave or convex surface facing down, and a planar surface facing up. Once this resin has been cured, the completed lens can be released from the depression in the substrate.

Once the input parameters and test data are communicated to the 3D printer via a software application, the custom lens device is 3D printed. In one embodiment, the custom lens device is manufactured of silicone, or another suitable, biocompatible, curable lens material as is known in the art.

In one embodiment, the custom lens device that is 3D printed is a personalized customized contact lens, replacement lens, or eyeglass lens applicable to each individuality, based on the multinomial condition such as radian, hardness, toughness, wettability, light transmittance of myopia degree, and/or astigmatism degree, as well as based on the data from scanning, measuring and mapping a user's retina via OCT or other measuring means and data from subjective tests compiled from an Amsler grid or other measuring means. Further, the 3D printed lenses can be customized according to demand and/or need.

In one embodiment, the custom lens device is a replacement lens, a contact lens, or a lens for an eyeglass frame comprising a body component that is concave, such that the body component is thinnest in the center, to correct nearsightedness (myopia). In another embodiment, the body component is convex, such that the body component is thickest in the center, to correct farsightedness (hyperopia). In yet another embodiment, the body component can curve more in one direction than in the other to correct astigmatism. The body component of the replacement lens or the contact lens is typically circular in shape but can be any suitable shape as is known in the art, depending on the needs and/or wants of a user. Further, the body component of the eyeglass lens is typically of the size and shape to fit standard eyeglass frames but can be any suitable shape as is known in the art, depending on the needs and/or wants of a user.

Furthermore, by 3D printing or other three-dimensional processes, the custom lens device can pick up more corrective details derived from a map of the retinal surface inverted and reversed. Thus, convex bumps in the retina become corrected in part by concave parts of the custom lens device, along with other free form optics, where it translates to reverse the warped signal to the brain caused by the uneven, damaged retina from eye disease.

In one embodiment, the custom lens device is a 3D printed lens for an eyeglass frame. Further, the eyeglass frame, including the lens holder and the temples, can be fabricated using 3D printing to fit around and connect to the custom lenses. Generally, the eyeglass frame can be 3D printed either piece-by-piece or as single integrated unit. In one example, the eyeglass frame can be connected to the lenses before printing the eyeglass frame. In another example, the eyeglass frame can be printed separately and then mechanically connected to the lenses.

In yet another embodiment, the custom lens device comprises a plurality of indicia.

In yet another embodiment, a method of creating a customized, 3D printed lens for correcting distorted or warped vision is disclosed. The method includes the steps of providing a custom lens device comprising a 3D printed lens component. The method also comprises measuring a user's retina. Further, the method comprises scanning and mapping a user's retina via ocular coherence tomography, amplitude scans, wide-field retinal imaging, or fluorescein angiography. The method also comprises enabling a software application to communicate the data from the user's retinal measurements and mapping to the 3D printer. Finally, the method comprises 3D printing a custom lens based on this data.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

6

Figure 1:
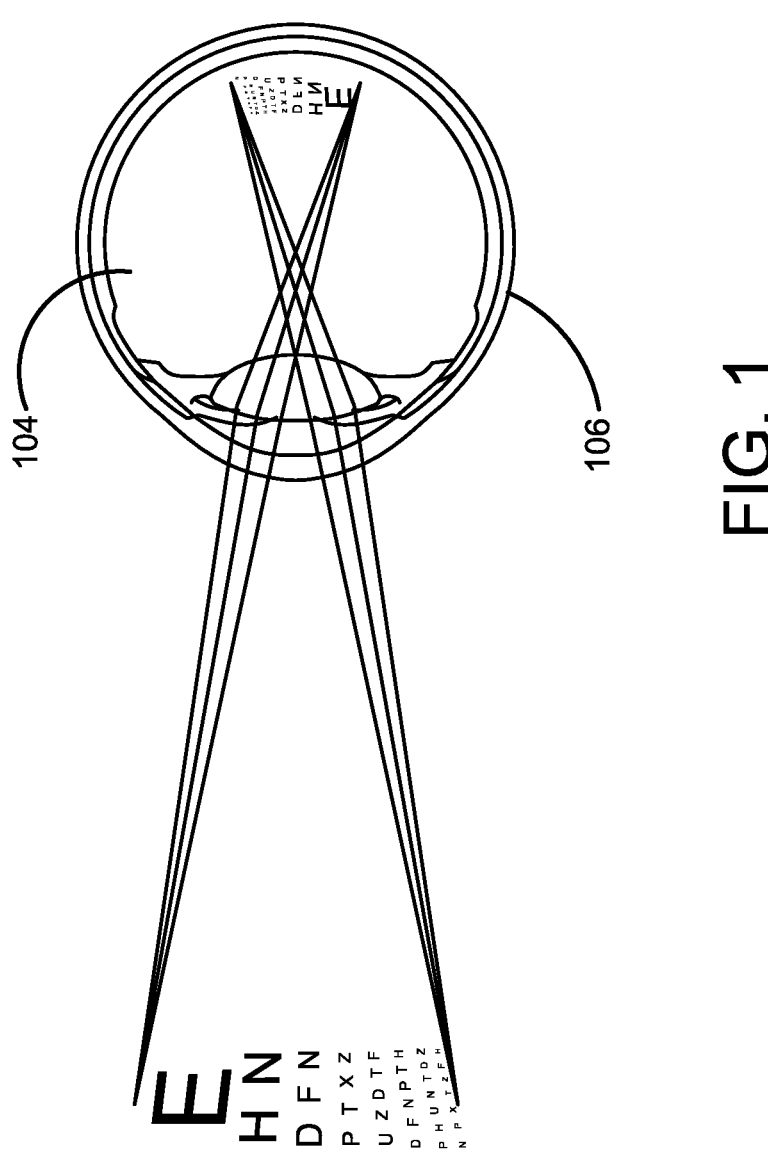
FIG. 1 illustrates a side perspective view of one embodiment of the custom lens device of the present invention showing a user with normal vision in accordance with the disclosed architecture.
Figure 2:
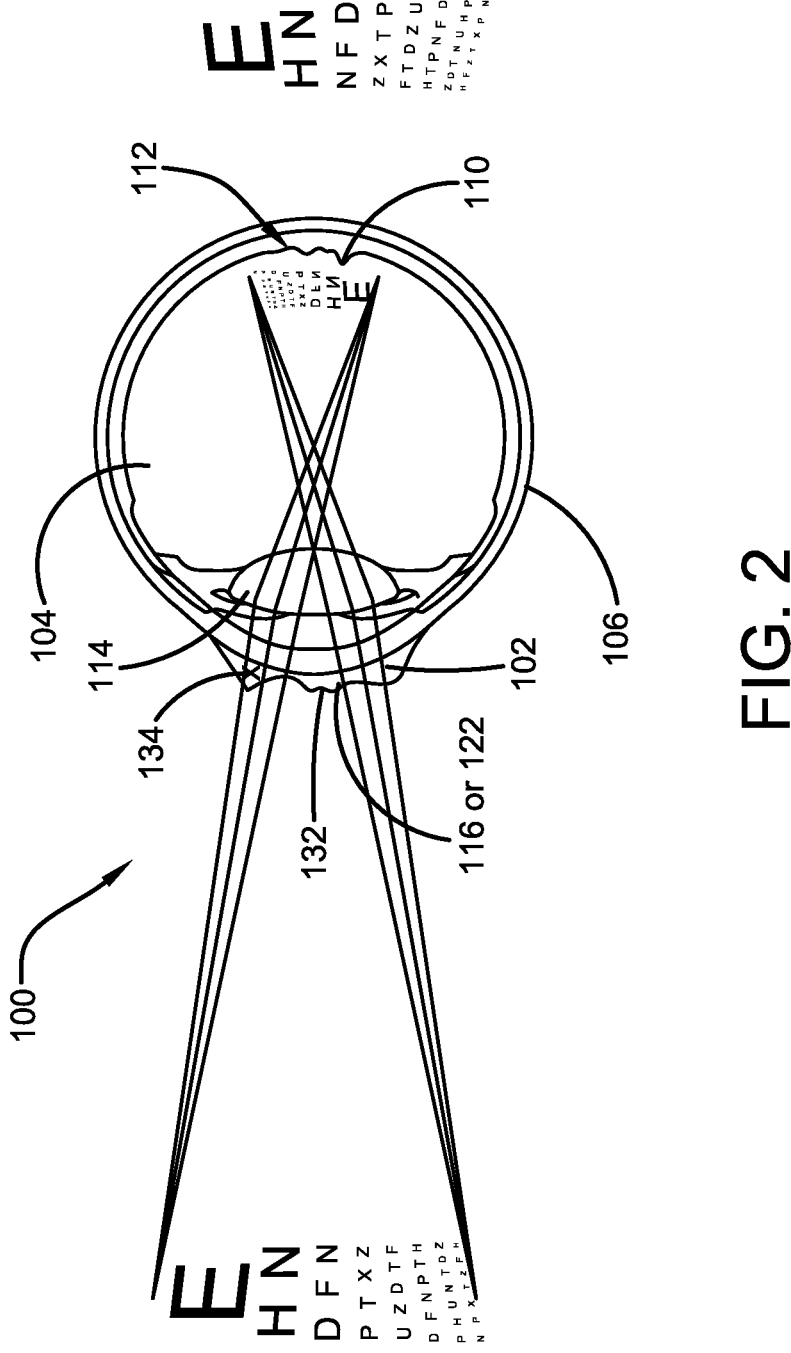
FIG. 2 illustrates a side perspective view of one embodiment of the custom lens device of the present invention showing the custom 3D printed lens device on the user's eye to correct vision in accordance with the disclosed architecture.
Figures 3A, 3B, 4:
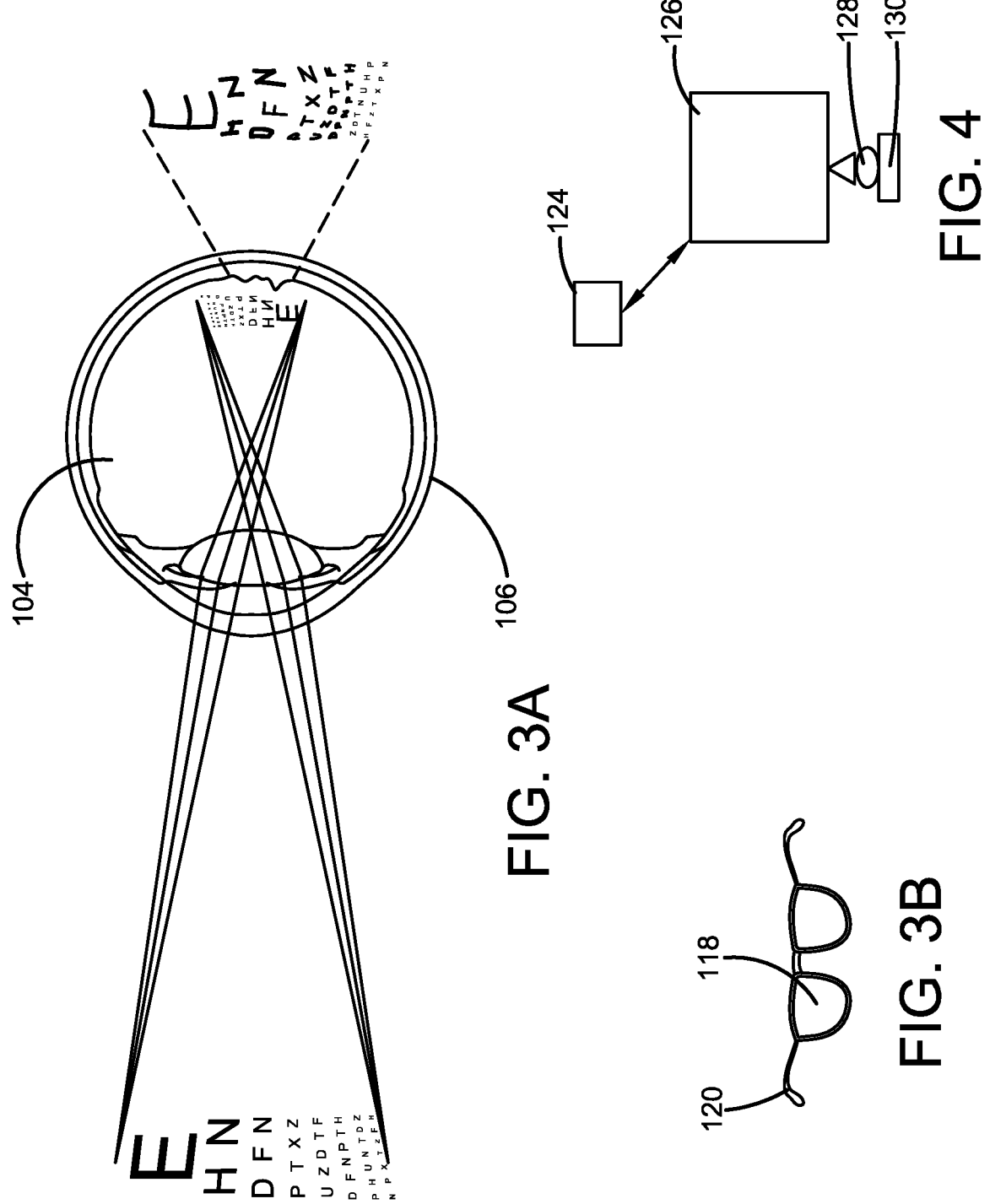
FIG. 3A illustrates a side perspective view of one embodiment of the custom lens device of the present invention showing a user with warped or damaged vision in accordance with the disclosed architecture.

FIG. 3B illustrates a front perspective view of one embodiment of the custom lens device of the present invention showing the device produced as an eyeglass lens in accordance with the disclosed architecture;

FIG. 4 illustrates a front perspective view of one embodiment of the custom lens device of the present invention showing the 3D printer and software application in accordance with the disclosed architecture; and FIG. 5 illustrates a flowchart showing the method of creating a customized, 3D printed lens for correcting distorted or warped vision in accordance with the disclosed architecture.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a custom lens device that provides users with a 3D printer and process that uses optical coherence tomography (OCT) scans and subjective data from a corrected Amsler grid to produce a custom lens. There is also a long-felt need in the art for a custom lens device that combines laboratory measurements of the retina and other eye surfaces that combine data with subjective patient input corrections to the Amsler grid to create a custom lens. Further, there is a long-felt need in the art for a custom lens device that helps correct distorted and warped vision due to various eye diseases, like epiretinal membrane and macular degeneration. Moreover, there is a long-felt need in the art for a device that enables a software application to communicate the data to the printer and create the patient's custom lens. Further, there is a long-felt need in the art for a custom lens device that can be produced as a replacement lens, a contact lens, or a lens for eyeglass frames. Finally, there is a long-felt need in the art for a custom lens device that can be a 3D printed scleral lens.

The present invention, in one exemplary embodiment, is a novel custom lens device. The device is a corrective lens created by a specialized 3D printer, or other three dimensional creating device, by which a qualified technician working with an ophthalmologist and/or an optometrist combine laboratory measurements of the retina and other eye surfaces, then combine that data with subjective input from the patient's correction to an Amsler grid, or other diagram, to create a custom lens that will un-distort vision which has been distorted (i.e., warped) due to undulations in the retina caused by a number of eye diseases, including, but not limited to, epiretinal membrane and macular degeneration. The present invention also includes a novel method of creating a customized, 3D printed lens for correcting distorted or warped vision. The method includes the steps of providing a custom lens device comprising a 3D printed lens component. The method also comprises measuring a user's retina. Further, the method comprises scanning and mapping a user's retina via ocular coherence tomography, amplitude scans, wide-field retinal imaging, or fluorescein angiography. The method also comprises enabling a software application to communicate the data from the user's retinal measurements and mapping to the 3D printer. Finally, the method comprises 3D printing a custom lens based on this data.

Referring initially to the drawings, FIGS. 1-3A illustrate a perspective view of one embodiment of the custom lens device 100 of the present invention. In the present embodiment, the custom lens device 100 is an improved custom lens device 100 that is a corrective lens created by a specialized 3D printer, by which a qualified technician working with an ophthalmologist and/or an optometrist combine laboratory measurements of the retina 104 and other eye surfaces 106, then combine that data with subjective input from the patient's correction to an Amsler grid, or other diagram, to create a custom 3D printed lens device 100 that will un-distort vision which has been distorted (i.e., warped), due to undulations in the retina 104 caused by a number of eye diseases, including, but not limited to, epiretinal membrane and macular degeneration. Specifically, the custom lens device 100 comprises a 3D printed body component 102 that can be sized and shaped to counteract or correct the bumps 110, distortions, and shape of a user's retina 104, thus correcting a user's warped vision 108.

Generally, users with various eye diseases which cause undulations (or bumps 110, distortions, etc.) in the retina 104, such as epiretinal membrane or macular degeneration, etc., or any other eye disease as is known in the art, can be difficult to treat. This is typically due to the convex bumps 110 in the retina 104, creating an uneven, damaged surface 112 and causing distorted and warped vision 108.

In operation, a qualified technician working with an ophthalmologist and/or an optometrist combine laboratory measurements of the retina 104 and other eye surfaces 106, then combine that data with subjective input from the patient's correction to an Amsler grid, or other diagram, to create the custom lens device 100 that will un-distort vision which has been distorted (i.e., warped 108), due to undulations 110 in the retina 104. The Amsler grid is a physical examination used to detect vision problems resulting from damage to the macula or the optic nerve. Specifically, the retina 104 would be scanned and mapped using Ocular Coherence Tomography (OCT) or other suitable topographical measuring devices like an A scan (Amplitude Scan), wide-field retinal imaging, Flourescein, Angiography, or other fine three-dimensional measuring tools as is known in the art, depending on the needs and/or wants of a user. Any suitable test and measuring devices can be utilized as is known in the art to gather data for printing a custom lens device that is customized (i.e., patient specific) to the shape, size, and undulations of a user's retina 104.

Generally, the custom lens device 100 can be a lens which is inserted as a replacement lens 114 to the patient's biologically native lens and is correctable over time if necessary. The custom lens device 100 can also be a contact lens 116 that is weighted to remain on axis to correct the user's vision. Further, the custom lens device 100 can be an eyeglass lens 118 that is put into common eyeglass frames 120 that although cannot move with the eye's axis of rotation, may greatly enhance reading ability or vision with low eye movement. Further, the custom lens device 100 can also be a scleral lens 122, which is an excellent platform for treating High Order Aberrations because they remain stable on the eye. Therefore, the scleral lens 122 may be 3D printed and utilized with the device 100. Further, any other suitable lenses as are known in the art can be utilized that can be customized during the 3D printing process, depending on the needs and/or wants of a user.

Then, once the data is collected from measuring, mapping, and scanning the retina 104, the data is then sent to a software application 124. The user then enables the software application 124 to communicate the data to the 3D printer 126 to create the custom lens device 100. Specifically, the custom lens device 100 will be a 3D printed polymer produced on the 3D printer 126. Alternatively, the custom lens device 100 can be produced from a 3D printed mold created from lens materials. Thus, the mold is 3D printed and the custom lens device 100 created from lens materials applied to the mold, or through other three-dimensional processes as is known in the art. This custom lens device 100 may also be made conventionally, but with potentially less accuracy. Any of these means of production of the custom lens device 100 can be utilized, as is known in the art, depending on the needs and/or wants of a user.

Further, additional input parameters can be utilized to 3D print the custom lens device 100. These input parameters are input into the 3D printer 126 and include, but are not limited to, myopia or hyperopia degree, astigmatism, light transmittance, the radian of the eyeball, etc., or any other suitable input parameters as is known in the art, depending on the needs and/or wants of a user. In one embodiment, the additional input parameters include the measurement of a user's corneal diameter, radius of curvature, and/or the base arc of the user's eyeball. Any other suitable input parameters can be utilized in creating the custom lens device 100 as is known in the art, as long as the input parameters aid in customizing the shape and size of the 3D printed lens device 100 for a user.

As shown in FIG. 4, generally, the 3D printing process includes placing droplets of lens material (resin 128) in a layer-by-layer manner on a substrate 130 to create the custom lens device 100. Each of these layers is very thin (i.e., with thicknesses on the order of microns), but in aggregate, they can form a thicker optical segment or lens (i.e., with a thickness on the order of millimeters or centimeters). The layers are cured (i.e., layer-by-layer with heat or UV light) to form the custom lens device 100.

Further, since each droplet can be small (i.e., on the order of microns) and the droplets can be deposited in almost arbitrary shapes, such that they can be used to make custom surfaces for prescription lenses that don't need to be ground or finished.

Once cured, a custom lens device 100 is formed (i.e., a contact lens 116, a replacement lens 114, a Scleral lens 122, an eyeglass frame lens 118, etc., or any other customized optical component as is known in the art). Any other suitable customized optical components can be produced as is known in the art, depending on the needs and/or wants of a user.

In one embodiment, the substrate can include any substrate 130 that can support the processing of the custom lens device 100 via 3D printing. If desired, the substrate 130 can include or be coated with a non-stick material. For example, the substrate 130 can include silicone, polydimethylsiloxane (PDMS), polytetrafluoroethylene (PTFE), ceramic, or any other non-stick material. In another example, the substrate 130 can include a rigid material coated with a non-stick material on the surface. For example, the rigid material can include plastic, metal, or glass. If desired, a portion of the substrate 130 may be patterned or indented to hold the custom lens device 100.

The substrate 130 can also have a dimple or depression for molding the custom lens device 100. Resin 128 or other polymers may be deposited in the depression and cured to form a concave or convex surface facing down, and a planar surface facing up. Once this resin 128 has been cured, the completed lens can be released from the depression in the substrate 130.

Once, the input parameters and test data are communicated to the 3D printer 126 via a software application 124, the custom lens device 100 is 3D printed. In one embodiment, the custom lens device 100 is manufactured of silicone or another suitable, biocompatible, curable lens material as is known in the art.

Accordingly, the custom lens device 100 that is 3D printed is a personalized, customized contact lens 116, replacement lens 114, or eyeglass lens 118 applicable to each individuality, based on the multinomial condition such as radian, hardness, toughness, wettability, light transmittance of myopia degree, and/or astigmatism degree, as well as based on the data from scanning, measuring, and mapping a user's retina via OCT or other measuring means and data from subjective tests compiled from an Amsler grid or other measuring means. Further, the 3D printed lenses 100 can be customized according to demand and/or need.

In one embodiment, the custom lens device 100 is a replacement lens 114, a contact lens 116, or a lens 118 for an eyeglass frame 120 comprising a body component 102 that is concave, such that the body component 102 is thinnest in the center, to correct nearsightedness (myopia). In another embodiment, the body component 102 is convex, such that the body component 102 is thickest in the center, to correct farsightedness (hyperopia). In yet another embodiment, the body component 102 can curve more in one direction than in the other to correct astigmatism. The body component 102 of the replacement lens 114 or the contact lens 116 is typically circular in shape but can be any suitable shape as is known in the art, depending on the needs and/or wants of a user. Further, the body component 102 of the eyeglass lens 118 is typically of the size and shape to fit standard eyeglass frames 120 but can be any suitable shape as is known in the art, depending on the needs and/or wants of a user.

Furthermore, by 3D printing or other three-dimensional processes, the custom lens device 100 can pick up more corrective details derived from a map of the retinal surface inverted and reversed. Thus, convex bumps 110 in the retina 104 become corrected by concave parts 132 of the custom lens device 100, where it translates to reverse the warped signal to the brain caused by the uneven, damaged retina from eye disease.

As shown in FIG. 3B, in one embodiment, the custom lens device 100 is a 3D printed lens 118 for an eyeglass frame 120. Further, the eyeglass frame 120, including the lens holder and the temples, can be fabricated using 3D printing to fit around and connect to the custom lenses 118. Generally, the eyeglass frame 120 can be 3D printed either piece-by-piece or as single integrated unit. In one example, the eyeglass frame 120 can be connected to the lenses 118 before printing the eyeglass frame 120. In another example, the eyeglass frame 120 can be printed separately and then mechanically connected to the lenses 118.

In yet another embodiment, the custom lens device 100 comprises a plurality of indicia 134. The body component 102 of the device 100 may include advertising, trademark, other letters, designs, or characters, printed, painted, stamped, or integrated into the body component 102, or any other indicia 134 as is known in the art. Specifically, any suitable indicia 134 as is known in the art can be included, such as, but not limited to, patterns, logos, emblems, images, symbols, designs, letters, words, characters, animals, advertisements, brands, etc., that may or may not be eye, lens, or brand related.

FIG. 5 illustrates a flowchart of the method of creating a customized, 3D printed lens for correcting distorted or warped vision. The method includes the steps of at 500, providing a custom lens device comprising a 3D printed lens component. The method also comprises at 502, measuring a user's retina. Further, the method comprises at 504, scanning and mapping a user's retina via ocular coherence tomography, amplitude scans, wide-field retinal imaging, or fluorescein angiography. The method also comprises at 506, enabling a software application to communicate the data from the user's retinal measurements and mapping to the 3D printer. Finally, the method comprises at 508, 3D printing a custom lens based on this data.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "custom lens device", "lens device", and "device" are interchangeable and refer to the custom lens device 100 of the present invention.

Notwithstanding the foregoing, the custom lens device 100 of the present invention can be of any suitable size and configuration as is known in the art without affecting the overall concept of the invention, provided that it accomplishes the above-stated objectives. One of ordinary skill in the art will appreciate that the custom lens device 100 as shown in FIGS. 1-4 are for illustrative purposes only, and that many other sizes and shapes of the custom lens device 100 are well within the scope of the present disclosure. Although the dimensions of the custom lens device 100 are important design parameters for user convenience, the custom lens device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A custom lens device that is a corrective lens created by a specialized 3D printer, the custom lens device comprising:
   a body component;
   wherein user data is input into a software application which communicates the user data to a 3D printer;
   wherein the 3D printer uses the user data to print the body component; and
   wherein the body component is sized and shaped to correct bumps, distortions, and shape of a user's retina;
   wherein a user's retina is scanned and mapped using an A scan (Amplitude Scan) or ultra-wide field retinal imaging to produce the user data used in the 3D printer;
   wherein the user data comprises a degree of myopia or hyperopia, a presence of astigmatism, a light transmittance, a radian of an eyeball of the user, a corneal diameter of the user, a radius of curvature of the eyeball of the user, and a base arc of the eyeball of the user; and
   wherein the body component is shaped based on the retinal scan such that concave portions of the body component correspond to convex deformities of the user's retina to reverse warped visual signals caused by an uneven, damaged retina.

2. The custom lens device of claim 1, wherein users with epiretinal membrane or macular degeneration would utilize the custom lens device to correct their warped vision.

3. The custom lens device of claim 2, wherein an ophthalmologist or an optometrist combine laboratory measurements of a user's retina and other eye surfaces with data from a user's Amsler grid to produce the user data used in the 3D printer.

4. The custom lens device of claim 3, wherein the custom lens device is a replacement lens to a user's biologically native lens and is correctable over time if necessary.

5. The custom lens device of claim 1, wherein the custom lens device is a contact lens that is weighted to remain on axis to correct a user's vision.

6. The custom lens device of claim 1, wherein the custom lens device is an eyeglass lens that is placed into common eyeglass frames that although cannot move with an eye's axis of rotation but may greatly enhance reading ability or vision with low eye movement.

7. The custom lens device of claim 1, wherein the custom lens device is a scleral lens.

8. The custom lens device of claim 1, wherein the custom lens device is a 3D printed polymer produced on the 3D printer.

9. The custom lens device of claim 1, wherein the custom lens device is produced from a 3D printed mold created from lens materials.

10. The custom lens device of claim 1, wherein 3D printing process includes placing droplets of resin, in a layer-by-layer manner on a substrate and curing layers to create the custom lens device.

11. The custom lens device of claim 1, wherein the body component is concave, such that the body component is thinnest in center to correct myopia; convex, such that the body component is thickest in center to correct hyperopia; or curved more in one direction than in other to correct astigmatism.

12. The custom lens device of claim 1, wherein the body component can be 3D printed with concave parts that correct convex bumps in the user's retina to reverse warped signal to a user's brain caused by an uneven, damaged retina from eye disease.

13. A custom lens device that is a corrective lens created by a specialized 3D printer, the custom lens device comprising:
   a body component that is a 3D printed polymer produced on a 3D printer; and
   wherein an ophthalmologist or an optometrist combine laboratory measurements of a user's retina and other eye surfaces with data from a user's Amsler grid to produce user data used in the 3D printer;
   wherein a user's retina is scanned and mapped using an A scan (Amplitude Scan) or ultra-wide field retinal imaging to also produce the user data used in the 3D printer;
   wherein the user data is input into a software application which communicates the user data to the 3D printer;
   wherein the 3D printer uses the user data to print the body component;
   wherein the body component is sized and shaped to correct bumps, distortions, and shape of a user's retina based on the retinal scan; and
   wherein the body component can be 3D printed with concave parts that correct convex bumps in the user's retina to reverse warped signals to a user's brain caused by an uneven, damaged retina from eye disease; and
   further wherein the body component is printed on a ceramic coated substrate comprising an indentation for holding the custom lens.

14. The custom lens device of claim 13 further comprising a plurality of indicia.

15. The custom lens device of claim 13, wherein the custom lens device is a replacement lens to a user's biologically native lens and is correctable over time if necessary.

16. The custom lens device of claim 13, wherein the custom lens device is a contact lens that is weighted to remain on axis to correct a user's vision.

17. The custom lens device of claim 13, wherein the custom lens device is an eyeglass lens that is placed into common eyeglass frames that although cannot move with an eye's axis of rotation but may greatly enhance reading ability or vision with low eye movement.

18. The custom lens device of claim 13, wherein the custom lens device is a scleral lens.

19. A method of creating a customized, 3D printed lens for correcting distorted or warped vision, the method comprising the following steps:
   providing a custom lens device comprising a 3D printed lens component;
   measuring a user's retina;
   scanning and mapping a user's retina via amplitude scans or ultra-wide field retinal imaging;
   measuring user data comprising a degree of myopia or hyperopia, a presence of astigmatism, a light transmittance, a radian of an eyeball of the user, a corneal diameter of the user, a radius of curvature of the eyeball of the user, and a base arc of the eyeball of the user;
   enabling a software application to communicate data from the user's retinal measurements, the user data, and mapping to a 3D printer; and
   3D printing a custom lens based on this data, wherein the custom lens is printed on a non-stick coated substrate comprising a dimple for molding the custom lens.

* * * * *